C. W. COFFEY.
AUTOMOBILE ATTACHMENT.
APPLICATION FILED APR. 24, 1917.
1,249,901.
Patented Dec. 11, 1917.
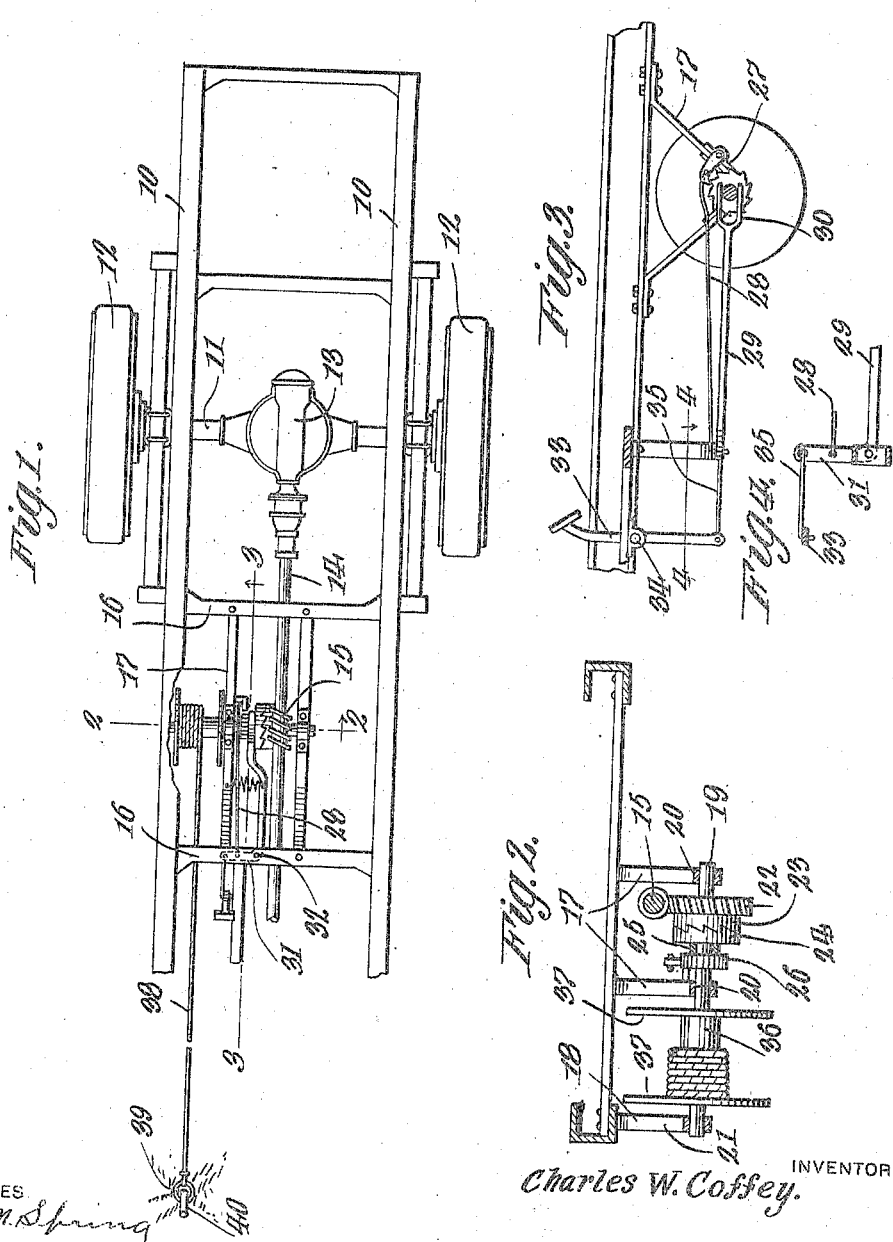
WITNESSES
INVENTOR
Charles W. Coffey.
BY
ATTORNEY

UNITED STATES PATENT OFFICE.

CHARLES W. COFFEY, OF CANTON, OHIO.

AUTOMOBILE ATTACHMENT.

1,249,901.  Specification of Letters Patent.  Patented Dec. 11, 1917.

Application filed April 24, 1917. Serial No. 164,179.

*To all whom it may concern:*

Be it known that I, CHARLES W. COFFEY, a citizen of the United States, residing at Canton, in the county of Stark and State of Ohio, have invented certain new and useful Improvements in Automobile Attachments, of which the following is a specification.

This invention has relation to improvements in motor vehicles, and has for an object to provide means therein for urging the vehicle forward when the driving wheels are no longer effective for that purpose, and the improvement includes a drum having a cable wound thereabout, one end of which is adapted to be connected to a stake driven into the ground or other relatively stationary object, and means operable by the engine of the vehicle for rotating the drum whereby the vehicle may be moved as above set forth.

In addition to the foregoing my invention comprehends improvement in the details of construction and arrangement of the parts to be hereinafter more fully described and particularly set forth in the appended claims.

In the accompanying drawings in which similar and corresponding parts are designated by the same characters of reference throughout the several views in which they appear:

Figure 1, is a view in plan of the rear portion of a chassis illustrating the embodiment therein of my invention.

Fig. 2, is a transverse section taken on the line 2—2 of the preceding figure.

Fig. 3, is a longitudinal section taken on the line 3—3 of Fig. 1, and

Fig. 4, is a detail view taken on the line 4—4 of Fig. 3.

With reference to the drawings 10 indicates the longitudinal frame members of a motor truck of conventional design, 11 indicates the rear axle, 12 the rear driving wheels, and 13 the differential casing. The propeller shaft 14 which extends centrally and longitudinally of the chassis and is associated at its rear end with the differential mechanism is provided at a point forward of the differential with a worm gear 15.

Transverse frame bars 16 are supported at opposite ends upon the longitudinal frame members of the chassis in longitudinally spaced relation, and longitudinally extending hanger brackets 17 are depended at their ends from said frame bars 16, said hanger brackets being indicated at 17, a similar hanger bracket 18 is depended from the right hand chassis member 10. Extending transversely of the vehicle is a shaft 19 which is journaled in brackets 20 mounted upon the brackets 17 and in a bearing 21 mounted upon the bracket 18. The shaft 19 carries a worm wheel 22 which is located between the brackets 17 for meshing engagement with the gear 15, said worm wheel 22 being furthermore formed upon its right hand face with a clutch member 23. A collar or other suitable means may be provided whereby to prevent longitudinal movement of the worm wheel 22 upon the shaft, as said worm wheel is loosely mounted upon the shaft and adapted for free rotation thereupon. A second clutch member 24 is mounted upon the shaft and is adapted for engagement with the clutch member 23 when moved into engagement therewith for that purpose. Said clutch member having a sleeve 25 formed concentrically thereupon adapted to embrace the shaft and is fixed to said shaft for rotation therewith but adapted for longitudinal sliding movement. A ratchet wheel 26 is formed with the sleeve 25 in spaced relation to the clutch member 24 for a purpose which will be presently noted. A pawl 27 is pivotally mounted upon one of the brackets 17 for engagement with the ratchet wheel 26, said pawl is connected through the medium of a forwardly extending rod 28 with the forward end of a shipper lever 29. Said shipper lever is extended longitudinally of the car and is provided with a bifurcated portion 30 at its rear end which is adapted to straddle the sleeve 25 and is disposed between the ratchet wheel 26 and the clutch member 24, the forward end of said shipper lever being bent at right angles as indicated at 31 and pivotally mounted at the bend therein as indicated at 32 upon the forward transverese bar 16. A foot pedal 23 is mounted upon any part of the chassis frame for movement about a fulcrum as indicated at 34. The upper end being engageable by the foot of the operator and for that purpose is extended through the floor of the car. The lower end of the foot pedal is then connected through the medium of a rod 35 with the aforesaid end 31 of the shipper lever. It will be apparent that by oscillating the foot pedal, the pawl 27 may be thrown into or out of engagement with the associated ratchet wheel as the case may be, and it will be apparent that the shipper lever 29 will be oscillated in unison to shift the clutch member 24 as well as the ratchet wheel 26 longitudinally upon their supporting shaft. The ratchet wheel 26 should be of a sufficient width to permit the pawl to engage therewith regardless of the position of the ratchet wheel.

Mounted upon the shaft 19 is a drum 36 having flanges 37 at either end and located preferably between one of the brackets 17 and the adjacent bracket 18. The drum is keyed to the shaft for rotation therewith, and a cable 38 is provided having one end secured to the drum and the opposite end provided with a ring 39 which may be placed around a stake 40 driven into the earth.

From the foregoing it will be obvious that in the event that a motor vehicle, truck or whatever machine the device may be applied to is stalled so that its driving wheels are inoperative for the purpose of producing further movement thereof, the free end of the cable 38 is attached to the stake 40 mentioned above to a tree or other substantially stationary object, and the foot pedal 33 pressed forward. As a result of this movement of the foot pedal the clutch member 24 will be thrown into engagement with the complementary clutch member 23, and if the engine of the vehicle is now set in motion, the motion of the propeller shaft 14 will be transmitted through the medium of the worm and worm wheel 15 and 22 respectively, to the shaft 19 and consequently through the clutch member to the drum 36. As said drum rotates the cable will be wound thereupon, and the vehicle will be obviously drawn forward. Simultaneously with the movement of the shipper lever, to throw the clutch members into engagement, the pawl 27 will be thrown out of engagement with the associated ratchet wheel whereby to permit such rotation of the drum as set forth above. A return of the foot pedal to former position will again disengage the clutch members and throw the pawl into engagement with its ratchet, whereby to retain the drum against movement and consequently to retain the truck in any position to which it may have been advanced by the winding up of the cable. The movement of the truck may thus be accomplished gradually and by degrees without imparting undue strain upon the engine.

While I have illustrated and described my invention with some degree of particularity, I realize that in practice various alterations thereover may be made, and I therefore desire to reserve the right and privilege of changing the form of the details of construction, or otherwise altering the arrangement of the correlated parts without departing from the spirit of the invention or the scope of the appended claim.

Having thus described my invention, what I claim as new and desire to secure by Letters Patent is:—

In a motor vehicle, the combination with the propeller shaft of a worm mounted thereon, a counter shaft journaled in the vehicle at right angles to the propeller shaft, a worm wheel on said counter shaft for engagement with the worm of the propeller shaft, a clutch member on said worm wheel, said worm wheel being loosely mounted on the counter shaft, a second clutch member splined to the counter shaft for engagement with the first clutch member, a ratchet wheel mounted on said counter shaft, a drum mounted on said counter shaft, a cable having one terminal wound about the drum, a bell crank mounted in the vehicle frame having one end engaging the second clutch member to shift the same, a pawl for engagement with the ratchet, a rod connecting the pawl with the bell crank, and a foot pedal for operating the bell crank whereby the clutch members may be brought into engagement and the pawl simultaneously moved out of engagement with its ratchet.

In testimony whereof I affix my signature in presence of two witnesses.

CHARLES W. COFFEY

Witnesses:
NATHEN COFFEY,
ANON MORELAND.